United States Patent
Qin et al.

(10) Patent No.: US 11,568,021 B2
(45) Date of Patent: Jan. 31, 2023

(54) VECTOR-VECTOR MULTIPLICATION TECHNIQUES FOR PROCESSING SYSTEMS

(71) Applicant: Alibaba Group Holding Limited, Grand Cayman (KY)

(72) Inventors: Minghai Qin, Hangzhou (CN); Zhibin Xiao, Hangzhou (CN); Chunsheng Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 38 days.

(21) Appl. No.: 16/798,123

(22) Filed: Feb. 21, 2020

(65) Prior Publication Data
US 2021/0263992 A1   Aug. 26, 2021

(51) Int. Cl.
| | |
|---|---|
| *G06F 17/16* | (2006.01) |
| *G06F 7/50* | (2006.01) |
| *G06F 7/523* | (2006.01) |
| *G06F 7/544* | (2006.01) |

(52) U.S. Cl.
CPC .............. *G06F 17/16* (2013.01); *G06F 7/50* (2013.01); *G06F 7/523* (2013.01); *G06F 7/5443* (2013.01)

(58) Field of Classification Search
CPC . G06F 17/16; G06F 7/50; G06F 7/523; G06F 7/5443; G06N 3/04; G06N 3/0481; G06N 3/063
See application file for complete search history.

(56) References Cited

U.S. PATENT DOCUMENTS

| | | |
|---|---|---|
| 10,592,801 B2 | 3/2020 | Chen et al. |
| 2018/0114117 A1 | 4/2018 | Lin et al. |
| 2018/0246855 A1 | 8/2018 | Redfern et al. |
| 2019/0073583 A1 | 3/2019 | Chen et al. |
| 2019/0205729 A1 | 7/2019 | Tran et al. |
| 2019/0228307 A1 | 7/2019 | Lee et al. |
| 2019/0340497 A1 | 11/2019 | Baraniuk et al. |

(Continued)

OTHER PUBLICATIONS

Rectified Linear Units, deepai.org, downloaded from https://deepai.org/machine-learning-glossary-and-terms/rectified-linear-units, 2019 (Year: 2019).*

(Continued)

*Primary Examiner* — Emily E Larocque

(57) ABSTRACT

Vector-vector multiplication or matrix-matrix multiplication computation on computing systems can include computing a first portion of a vector-vector multiplication product based on a most-significant-bit set of a first vector and a most-significant-bit set of a second vector, and determining if the first portion of the vector-vector multiplication product is less than a threshold. If the first partial vector-vector multiplication product is not less than the threshold, a remaining portion of the vector-vector multiplication product can be computed, and a rectified linear vector-vector multiplication product can be determined for the sum of the first portion of the vector-vector multiplication product and the remaining portion of the vector-vector multiplication product. If the first portion of the vector-vector multiplication product is less than the threshold, computation of the remaining portion of the vector-vector multiplication product can be skipped and the rectified linear vector-vector multiplication product can be set to a zero scalar.

13 Claims, 9 Drawing Sheets

(56) References Cited

U.S. PATENT DOCUMENTS

| | | |
|---|---|---|
| 2019/0370642 A1 | 12/2019 | Liu et al. |
| 2019/0370660 A1 | 12/2019 | Wong et al. |
| 2020/0097796 A1 | 3/2020 | Du et al. |
| 2020/0097827 A1 | 3/2020 | Wang et al. |
| 2021/0049808 A1 | 2/2021 | Janus et al. |
| 2021/0056400 A1 | 2/2021 | Lie et al. |
| 2021/0065429 A1 | 3/2021 | Caulfield et al. |
| 2021/0072954 A1 | 3/2021 | Andraka |
| 2021/0072955 A1 | 3/2021 | Mellempudi et al. |
| 2021/0073171 A1 | 3/2021 | Master et al. |
| 2021/0073318 A1 | 3/2021 | Maiyuran et al. |
| 2021/0081691 A1 | 3/2021 | Chen et al. |
| 2021/0081769 A1 | 3/2021 | Chen et al. |
| 2021/0081774 A1 | 3/2021 | Barik et al. |
| 2021/0081789 A1 | 3/2021 | Chai et al. |
| 2021/0081806 A1 | 3/2021 | Chai et al. |
| 2021/0082154 A1 | 3/2021 | Brownlee et al. |
| 2021/0089301 A1 | 3/2021 | Mayuran et al. |
| 2021/0089875 A1 | 3/2021 | Tran et al. |
| 2021/0090207 A1 | 3/2021 | Doyle et al. |
| 2021/0097130 A1 | 4/2021 | Liu et al. |
| 2021/0097376 A1 | 4/2021 | Lie et al. |
| 2021/0097641 A1 | 4/2021 | Iyer et al. |
| 2021/0098477 A1 | 4/2021 | Tran et al. |
| 2021/0166464 A1* | 6/2021 | Moloney .............. G06T 15/005 |

OTHER PUBLICATIONS

Y. Lin et al., PredictiveNet: An Energy-efficient Convolutional Neural Network via Zero Prediction, IEEE 2017 (Year: 2017).*

D.A. Patterson et al., Computer Organization and Design: The Hardware/Software Interface, Elsevier Science and Technology, 2007 (Year: 2007).*

Soren Dittmer, Singular Values for ReLU; Journal; arXiv:1812.02566v2 [cs.LG] Aug. 12, 2019. 12 pp.

Tsui-Wei Weng; Towards Fast Computation of Certified Robustness for ReLU Networks; Journal; 10 pp. Massachusetts Institute of Technology, Cambridge, MA 2UC Davis, Davis, CA 3Harvard University, Cambridge, MA 4UT Austin, Austin, TX. Full version is available at https://arxiv.org/pdf/1804.09699. Proceedings of the 35th International Conference on Machine Learning, Stockholm, Sweden, PMLR 80, 2018. Copyright 2018.

Jason Brownlee; A Introduction to the Rectified Linear Unit (ReLU); Article; Jan. 9, 2019. 18 pp. Start Machine Learning.

Wikipedia; Retrieved from "https://en.wikipedia.org/w/index.php?title=Rectifier_(neural_networks)&oldid=946650383"; 6 pp.

* cited by examiner

VECTOR-VECTOR MULTIPLICATION TECHNIQUES FOR PROCESSING SYSTEMS

BACKGROUND OF THE INVENTION

Artificial intelligence (AI), machine learning, and deep learning are utilized for various image processing tasks, computer vision tasks, and the like. Artificial intelligence as used herein refers to techniques that enable devices to mimic human intelligence, using logic, if-then rules, decision trees, and the like. Machine learning includes a subset of artificial intelligence that includes abstruse statistical techniques that enable machines to improve at tasks with experience. Deep learning includes a subset of machine learning that includes algorithms that permit software to train itself to perform tasks by exposing multilayered artificial neural networks, recurrent neural networks (RNN), convolution neural networks (CNN) or the like to vast amounts of data. For ease of explanation artificial intelligence, as used herein, also includes machine learning, deep learning and the like. Furthermore, as used herein the term images refers to pictures and video.

The computation of vector-vector multiplication, matrix-matrix multiplication, activation functions and the like are common functions performed in artificial intelligence tasks and the like. Referring to FIG. 1, the computation of a vector-vector multiplication product is illustrated. The vector-vector multiplication of a first vector W and a second vector A is a binary operation that produces a scalar that is the sum of the products of the corresponding vector elements. The rectified linear (ReLU) function is an activation function defined as the positive part of its argument, in accordance with Equation 1:

$$f(x)=x^+=\max(0,x) \qquad (1)$$

where x is the input. The plot of the rectified linear (ReLU) function is a ramp where negative input values produce zero output values, and positive input values produce the same positive output value, as illustrated in FIG. 2.

Rectified linear vector-vector multiplication operations and rectified linear matrix-matrix multiplication operations are commonly performed on vast amounts of data in neural networks and other computations in artificial intelligence tasks. Therefore, there is a need for improved techniques for calculating rectified linear vector-vector multiplication operations and rectified linear matrix-matrix multiplication operations to reduce the computational workload in computing systems.

SUMMARY OF THE INVENTION

The present technology may best be understood by referring to the following description and accompanying drawings that are used to illustrate embodiments of the present technology directed toward vector-vector multiplication and matrix-matrix multiplication techniques for processing systems that can skip unnecessary portions of the calculations.

In one embodiment, a computing device can include a vector-vector multiplication unit, a rectified linear unit and a control unit. The vector-vector multiplication unit can be configured to compute a first portion of a vector-vector multiplication product based on a most-significant-bit (MSB) set of a first vector and a most-significant-bit (MSB) set of a second vector during a first computation pass. During one or more additional computation passes, a remaining portion of the vector-vector multiplication product can be computed. During the one or more additional computation passes, the sum of the first portion of the vector-vector multiplication product and the remaining portion of the vector-vector multiplication product can also be computed. The rectified linear unit can be configured to output a zero scalar as a rectified linear vector-vector multiplication product result when the first portion of the vector-vector multiplication product is less than the predetermined threshold. When the first portion of the vector-vector multiplication product is not less than the predetermined threshold, the rectified linear unit can be configured to output the sum of the first portion of the vector-vector multiplication product and the remaining portion of the vector-vector multiplication product as the rectified linear vector-vector multiplication product. The control unit can be configured to determine if the first portion of the vector-vector multiplication product is less than the predetermined threshold and to skip the one or more additional computation passes when the first partial vector-vector multiplication product is less than the predetermined threshold.

In another embodiment, a method of estimating a rectified linear vector-vector multiplication product can include computing a first portion of a vector-vector multiplication product using a most-significant-bit set of a first vector and a most-significant-bit set of a second vector. It can be determined if the first portion of the vector-vector multiplication product is less than a predetermined threshold. When the first portion of the vector-vector multiplication product is less than the predetermined threshold a rectified linear vector-vector multiplication product can be set to a zero scalar, thereby skipping the computation of the rest of the vector-vector multiplication product. When the first portion of the vector-vector multiplication product is not less than the predetermined threshold, a complete vector-vector multiplication product result can be computed. When the first partial vector-vector multiplication product is not less than the predetermined threshold, the rectified linear vector-vector multiplication product can be set to the complete vector-vector multiplication product result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
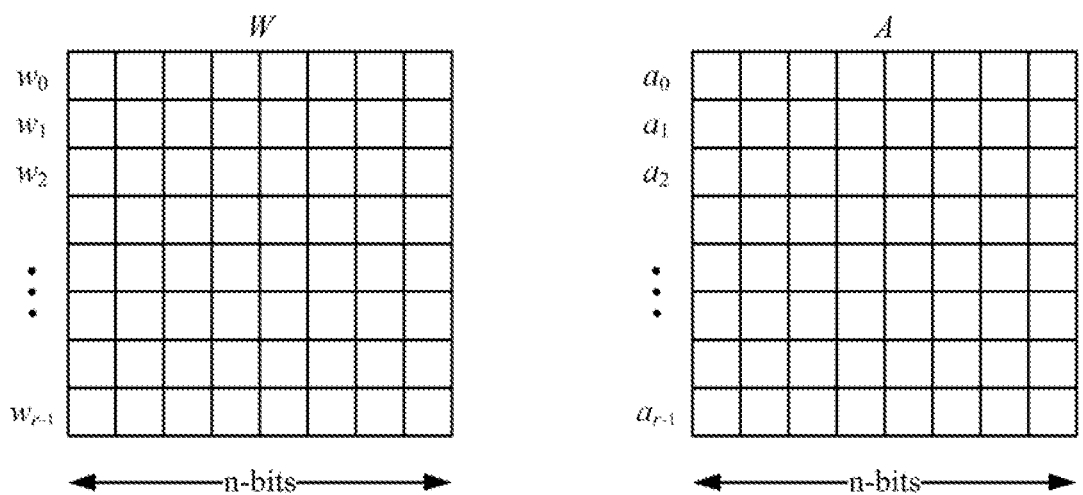
FIG. 1 illustrates computation of a vector-vector multiplication product, according to the conventional art.
Figure 2:
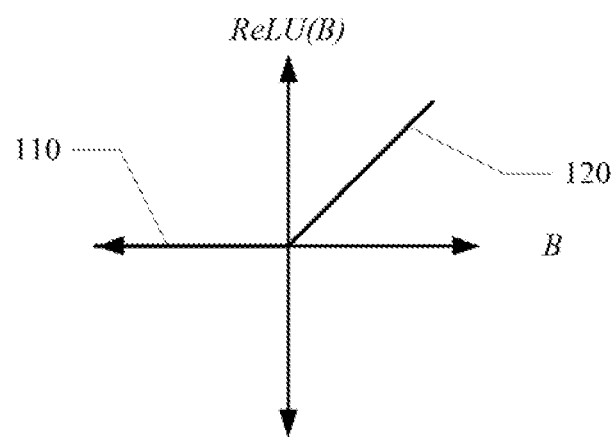
FIG. 2 illustrates a rectified linear activation function, according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 3:
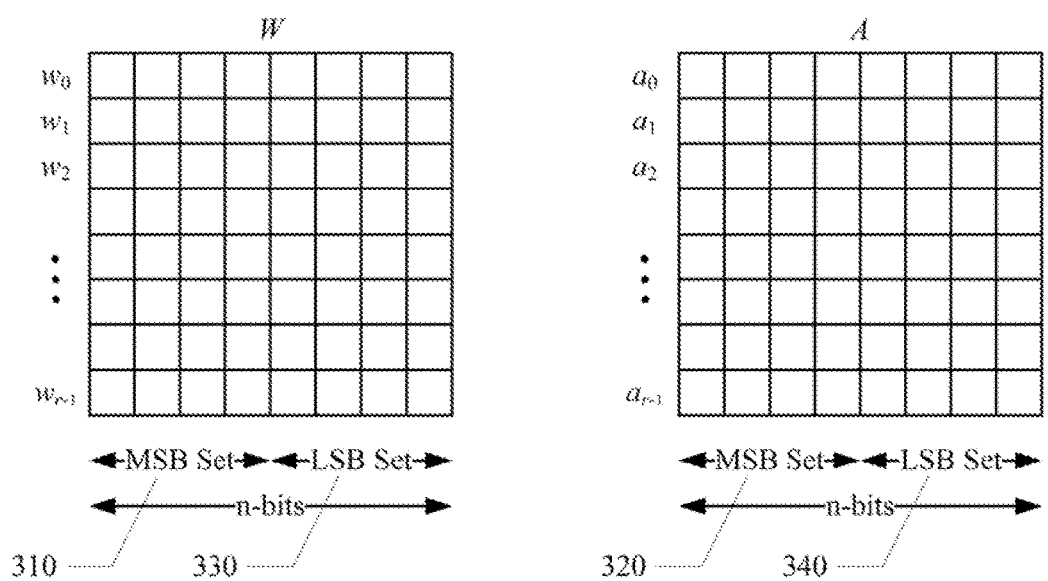
FIG. 3 shows a method of estimating a rectified linear function of a vector-vector multiplication product, in accordance with aspects of the present technology.

Referring now to FIG. 3, the estimation of a rectified linear function of a vector-vector multiplication is illustrated. The estimation can be performed on one or more computing devices, including but not limited to, a central processing unit (CPU), a graphics processing unit (GPU), a neural processing unit (NPU), a vector processor, a memory processing unit, or the like, or combinations thereof. The rectified linear vector-vector multiplication can be performed on a first vector W and a second vector A. Each vector can include r vector element values, and each vector value can be n binary bits. For example, in neural network applications, the vector elements can be 8-bit values. However, it is appreciated that the vector elements can be any predetermined number of bits. In one implementation, the first vector W can be a weight vector, and the second vector A can be an activation vector.

Figure 4A:
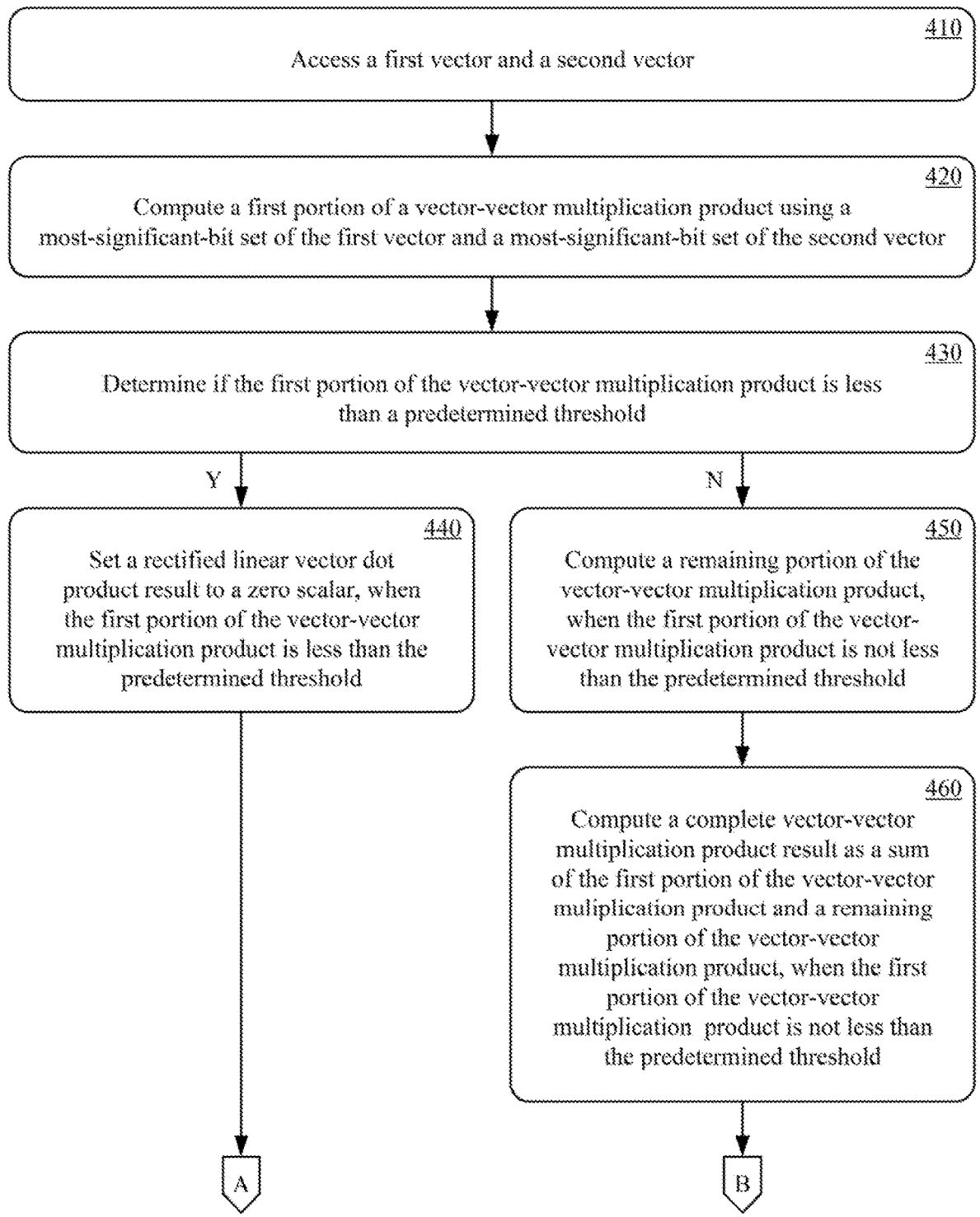
FIGS. 4A and 4B shows a method of estimating a rectified linear function of a vector-vector multiplication product, in accordance with aspects of the present technology.
Figure 4B:
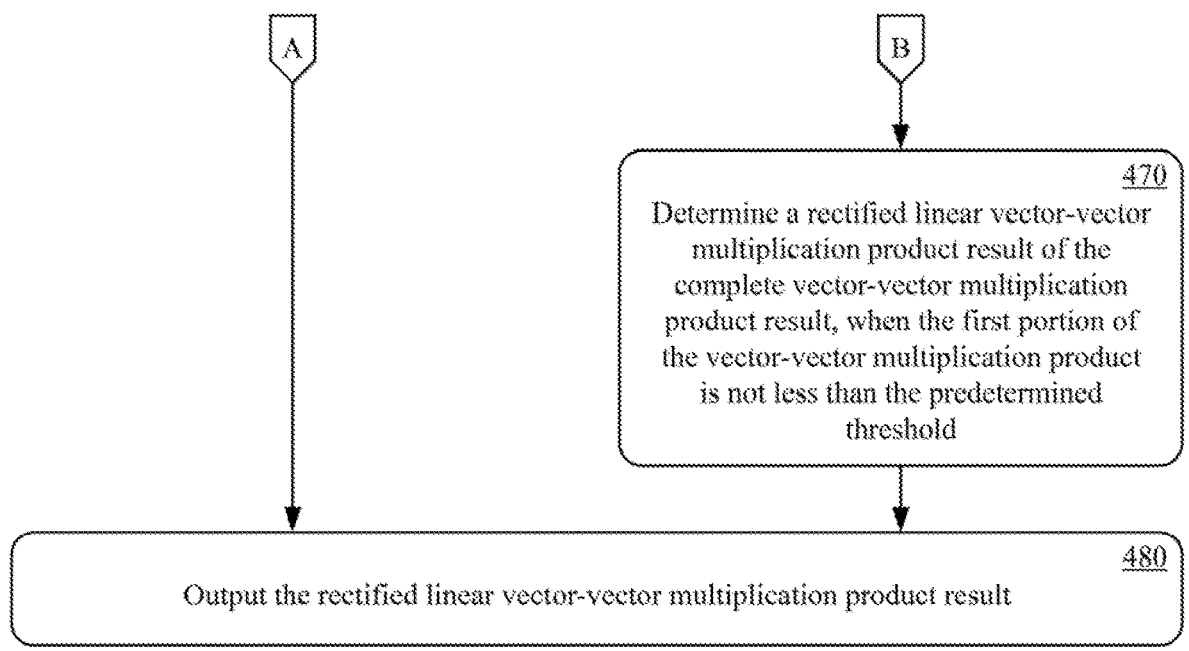

Estimation of the rectified linear function of the vector-vector multiplication of the first vector W and the second vector A will be further described with reference to FIG. 4. The estimation can begin with accessing the first vector W and the second vector A, at 410. Accessing the first vector W and the second vector A can include reading the vectors into a processing unit from one or more computing device readable media, such as but not limited to registers, cache or memory. Alternatively, accessing the first vector W and the second vector A can include receiving the vector on one or more communication links, and or the like At 420, a portion of the vector-vector multiplication product can be computed using a most-significant-bit (MSB) set of the first vector W and a most-significant-bit (MSB) set of the second vector A. In one implementation, the vector elements of the first and second vectors W, A can be 8-bit values, the most-significant-bit (MSB) sets can comprise the four most-significant-bits (MSBs) of the vector elements, and the least-significant-bit (LSB) sets can comprise the four least-significant-bits (LSBs) of the vector elements. Although aspects of the present invention are described herein with regard to 8-bit vector elements, with 4-bit most-significant-bit (MSB) sets and 4-bit least-significant-bit (LSB) sets, it is appreciated that the vector elements can be any predetermined number of bits and the most-significant-bit (MSB) sets and least-significant-bit (LSB) can be different ratios.

At 430, it can be determined if the portion of the vector-vector multiplication product is less than a predetermined threshold. If the portion of the vector-vector multiplication product is less than a predetermined threshold, the rectified linear vector-vector multiplication product result can be set to a zero value scalar, at 440. The value of the predetermined threshold can be selected such that when the partial vector-vector multiplication product based on the most-significant-bit (MSB) sets is negative by more than selected value, there is a high probability that the complete vector-vector multiplication product will also be a negative value. The computation based on one or more of the least-significant-bit (LSB) sets is not likely change the negative partial vector-vector multiplication product to a positive value. In one implementation, the predetermined threshold can be selected empirically.

If the partial vector-vector multiplication product is not less than a predetermined threshold, a remaining portion of the vector-vector multiplication product can be computed, at 450. For example the remaining portion of the vector-vector multiplication product can be computed based on the sums of the product of the most-significant-bit (MSB) set of the first vector W and the least-significant-bit (LSB) set of the second vector A, the product of the least-significant-bit (LSB) set of the first vector W and the most-significant-bit (MSB) set of the second vector A, and the product of the least-significant-bit (LSB) set of the first vector W and the least-significant-bit (LSB) set of the second vector A. At 460, a complete vector-vector multiplication product result can be computed as a sum of the first portion of the vector-vector multiplication product and a remaining portion of the vector-vector multiplication product, if the first portion of the vector-vector multiplication product is not less than the predetermined threshold. At 470, the rectified linear vector-vector multiplication product result can be determined from the complete vector-vector multiplication product result, if the first portion of the vector-vector multiplication product is not less than a predetermined threshold.

At 480, the rectified linear vector-vector multiplication product result can be output. Outputting the rectified linear vector product result can include, but is not limited to, writing the result to one or more computing device readable media, transmission on one or more communication links, and or the like.

Skipping the calculation of the remaining portion of the vector-vector multiplication product using the least-significant-bit (LSB) sets, when the first portion of the vector-vector multiplication product is less than the predetermined threshold, and setting the rectified linear vector-vector multiplication product result to zero can reduce processor utilization, memory access and or power consumption associated with computation of the vector-vector multiplication product. When computing a large number of vector-vector multiplication products as is typical in neural networks, the vector-vector multiplication product calculation results will on average be negative half the time. Skipping the calculations based on the least-significant bit (LSB) sets can result in an approximate 25% reduction in the computational workload of computing the vector-vector multiplication product. Furthermore, by selecting the number of most-significant-bits for calculating the first partial product and selecting the threshold value, the probability that the complete vector product will be negative when the first portion of the vector-vector multiplication product was positive or the complete vector-vector multiplication product will be positive when the first portion of the vector-vector multiplication product was negative can be kept very low, for example on the order of 5% or less. Such a low error rate in estimating the vector-vector multiplication product can be acceptable in most artificial intelligence tasks.

Figure 5:
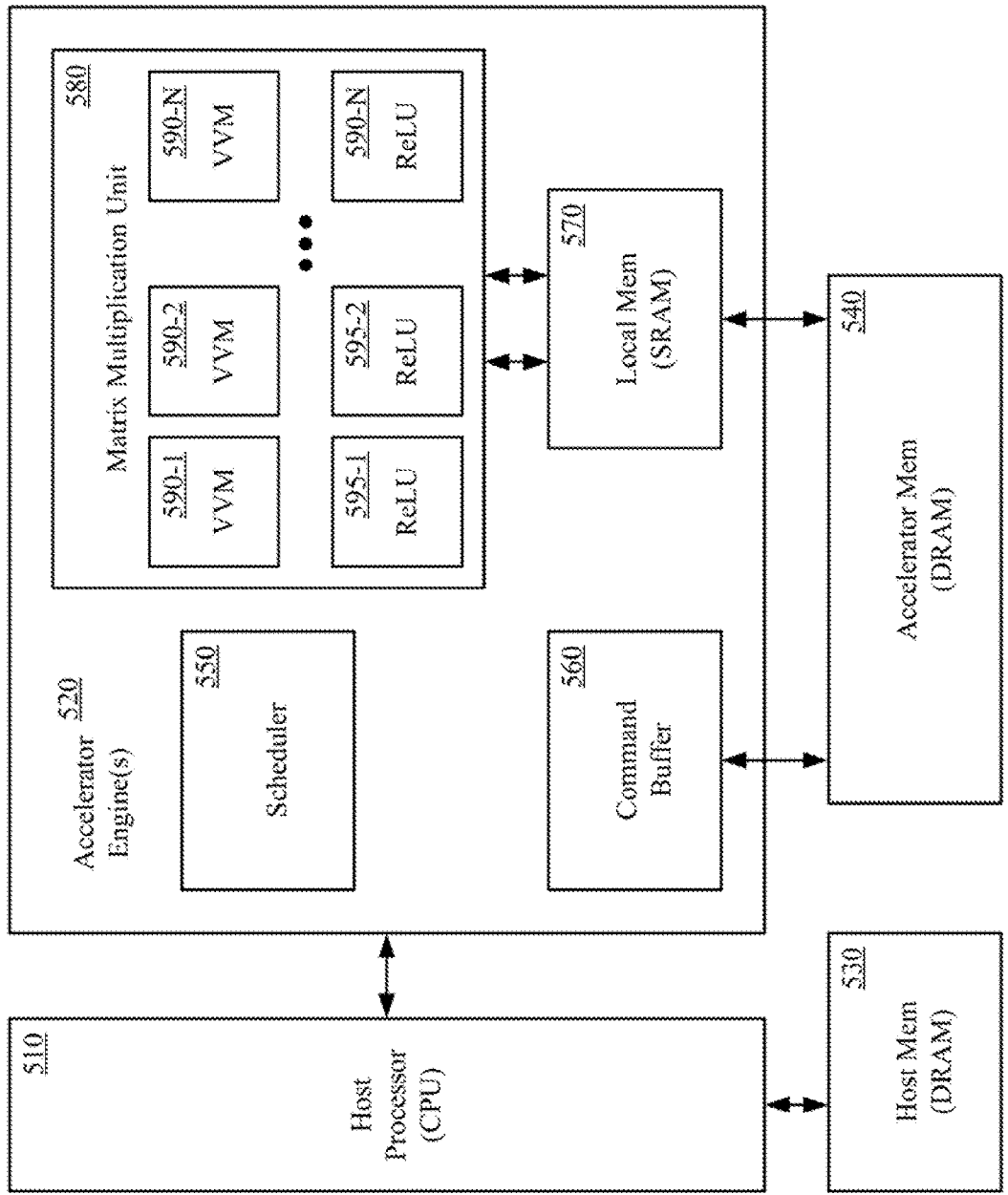
FIG. 5 shows a computing device for estimating a rectified linear function of a matrix-matrix multiplication product, in accordance with aspects of the present technology.

Referring now to FIG. 5, a computing device for estimating a rectified linear function of a matrix-matrix multiplication product, in accordance with aspects of the present technology, is shown. The computing device 500 can include a host processor 510, one or more accelerator engines 520, host memory 530 and accelerator memory 540. In one implementation, the host processor 510 can be a central processing unit (CPU) or the like. In one implementation, the one or more accelerator engines can be one or more graphics processing units (GPU), neural processing units (NPU), a vector processors, a memory processing units, or the like, or combinations thereof. In one implementation, the host memory 530 and the accelerator memory 540 can be respective dynamic random-access memory (DRAM) or the like. The host processor 510 can be configured to provision computation services including estimating rectified linear matrix-matrix multiplication products. The host memory 530 can be configured to store data and or instructions for use by the host processor 510.

The one or more accelerator engines 520 can be configured to estimate rectified linear matrix-matrix multiplication products. The one or more accelerator engines 520 can include a scheduler 550, a command buffer 560, local memory 570, and a matrix multiplication unit 580. In one implementation, the local memory can be static random-access memory (SRAM) or the like. The matrix multiplication unit 580 can include a plurality of sets of vector-vector multiplication units 590 and rectified linear units 595. The scheduler 550 and command buffer 560 can be configured to control the operation of the matrix multiplication unit 580 to compute a first portion of the matrix multiplication and determine if a second portion of the matrix-matrix multiplication operation can be skipped based on a threshold, due to the rectified linear function. Sets of vector-vector multiplication units 590 and rectified linear units 595, under control of the scheduler 550 and command buffer 560 can be utilized to substantially implement the estimation of the rectified linear function of the vector-vector multiplication operations.

In each set of the vector-vector multiplication units 590 and rectified linear units 595, a vector-vector multiplication unit 590-1 can be configured to compute a first portion of a vector-vector multiplication product based on a most-significant-bit (MSB) set of a first vector and a most-significant-bit (MSB) set of a second vector during a first computation pass. The vector-vector multiplication unit can also be configured to compute the remaining portions of the vector-vector multiplication product based on the product of the most-significant-bit (MSB) set of the first vector and the least-significant-bit (LSB) set of the second vector, the product of the least-significant-bit (LSB) set of the first vector and the most-significant-bit (MSB) set of the second vector, and the product of the least-significant-bit (LSB) set of the first vector and the least-significant-bit (LSB) set of the second vector during a second computation pass. The vector-vector multiplication unit can also be configured to compute a sum of the first portion of the vector-vector multiplication product and the remaining portion of the vector-vector multiplication product during the second computation pass.

In each set of the vector-vector multiplication units 590 and rectified linear units 595, a rectified linear unit can be configured to output a zero vector as a first rectified linear vector-vector multiplication product result when the first portion of the vector-vector multiplication product is less than the predetermined threshold. The rectified linear unit can be configured to output a rectified linear function of the sum as the complete rectified linear vector-vector multiplication product when the first partial vector-vector multiplication product is not less than the predetermined threshold.

A control unit, including a comparator, can be configured to determine if the first portion of the vector-vector multiplication product is less than the predetermined threshold. The control unit, further including the scheduler 550 and command buffer 560, can also be configured to skip the second computation pass when the first portion of the vector-vector multiplication product is less than the predetermined threshold.

Figure 6:
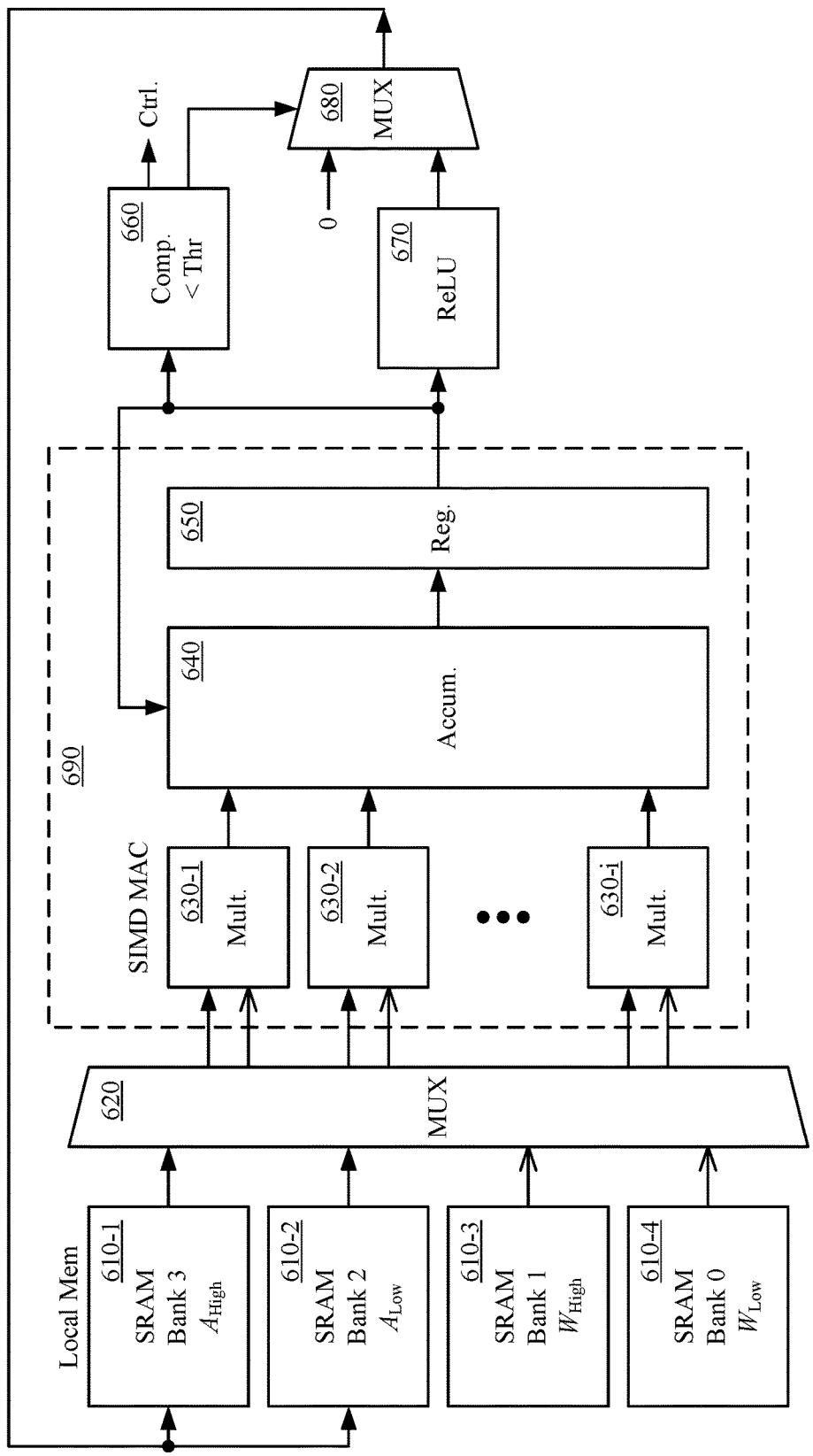
FIG. 6 shows a rectified linear vector-vector multiplication product unit, in accordance with aspects of the present technology.

Referring now to FIG. 6, a rectified linear vector-vector multiplication product unit, in accordance with aspects of the present technology, is shown. The rectified linear vector-vector multiplication product unit 600 can be utilized to substantially implement respective sets of vector-vector multiplication units 590 and rectified linear units 595, as described above with reference to FIG. 5. The rectified linear vector-vector multiplication product unit 600 can include local memory 610, a first multiplexor 620, a plurality of multipliers 630, an accumulator 640, a register 650, a threshold comparator 660, a rectified linear unit 670 and a second multiplexor 680. The combination of the first multiplexor 620, the plurality of multipliers 630, the accumulator 640, and the register 650 can implement a vector-vector multiplication unit 690. The local memory can be configured to cache the first vector A and the second vector W. In one implementation, the local memory can include multiple banks of static random-access memory (SRAM). In one implementation, a first bank of local memory 610-1 can cache the most-significant-bit (MSB) set of an activation vector, a second bank 610-2 can cache the least-significant-bit (LSB) set of the activation vector, a third bank 610-3 can cache the most-significant-bit (MSB) set of a weight vector, and a fourth bank 610-4 can cache the least-significant-bit (LSB) set of the weight vector.

The first multiplexor 620 can be configured to couple the most-significant-bit (MSB) set of the first vector A and the most-significant-bit (MSB) set of the second vector W to respective multipliers 630 in a first computation pass. For example, the most-significant-bit (MSB) set of the activation vector and the most-significant-bit (MSB) set of the weight vector can be coupled to a first multiplier 630-1, the most-significant-bit (MSB) set of the activation vector and the least-significant-bit (LSB) of the weight vector can be coupled to a second multiplier 630-2, and so on. The plurality of multipliers 630 can be configured to multiply respective bit sets of the activation vector and respective bit sets of the weight vector. In one implementation, the plurality of multipliers 630 can be single instruction multiple data (SIMD) multipliers. The accumulator 640 can be configured to sum appropriately bit shifted results of the plurality of multipliers 630. The register 650 can be configured to cache the sum of the partial products.

At the end of the first computation pass, the threshold comparator 660 of a control unit can be configured to compare the first portion of the vector-vector multiplication product to a predetermined threshold value to generate a control signal (ctrl). In one implementation, the control signal (Ctrl.) can be configured to cause one or more other circuits (not shown) of the control unit for the rectified linear vector-vector multiplication product unit 600 to skip a second computation pass if the first portion of the vector-vector multiplication product is less than the threshold. If the first portion of the vector-vector multiplication product is not less than the threshold, the control signal (Ctrl.) can cause the remaining portion of the vector-vector multiplication product to be performed.

During the first computation pass the comparator can also generate a selector signal for input to the second multiplexor 680 during the second computation pass. In one implementation, a first state of the selector signal is generated if the first portion of the vector-vector multiplication product is less than the threshold, and a second state of the selector signal is generated if the first portion of the vector-vector multiplication product is not less than the threshold.

The second multiplexor 680 can be configured to output a zero scalar value on a first input of the second multiplexor 680 if the second computation pass is skipped when the selector signal is in the first state. When the selector signal is in the second state, the second multiplexor 680 can output the rectified linear 670 vector-vector multiplication product result from the register 650 coupled to a second input of the second multiplexor 680 at the end of the second computation pass. In one implementation, the vector-vector multiplication product result can be output for storage back to the local memory 610 for use in subsequent processes.

Figure 7:
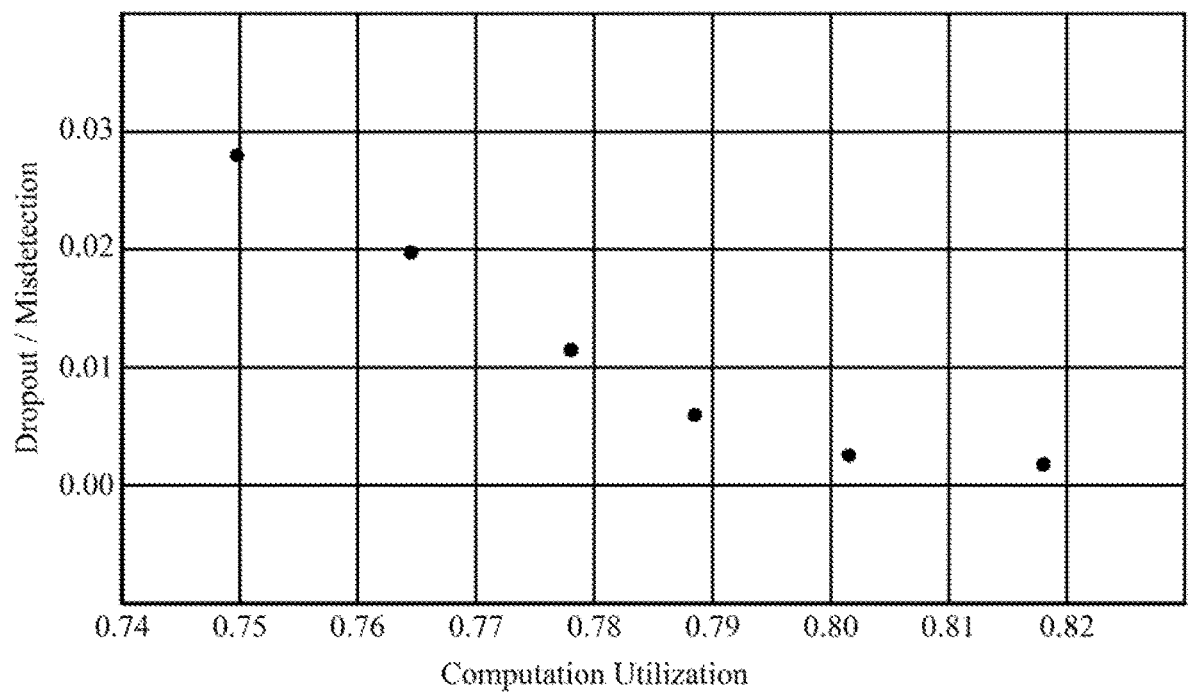
FIG. 7 illustrates an exemplary plot of computation utilization versus dropout/misdetection for rectified linear vector-vector multiplication, in accordance with aspects of the present technology.

Referring now to FIG. 7, an exemplary plot of computation utilization versus dropout/misdetection for rectified linear vector-vector multiplication, in accordance with aspects of the present technology, is illustrated. For an exemplary deep neural network (DNN) utilizing the tensorflow dataset Cifar100 and the residual neural network Wide-resnet-28, the computation workload increases as the dropout/misdetection rate is decreased. For a dropout of approximately 0%, the accuracy can be approximately 81.04%. For a dropout of approximately 5%, the accuracy can be approximately 80.5%. As illustrated in FIG. 7, at a computation savings of approximately 25%, the drop out can be less than 3% and the inference accuracy does not have a noticeable degradation. At a computation savings of approximately 20%, the dropout rate can be less than 0.5%.

Figure 8:
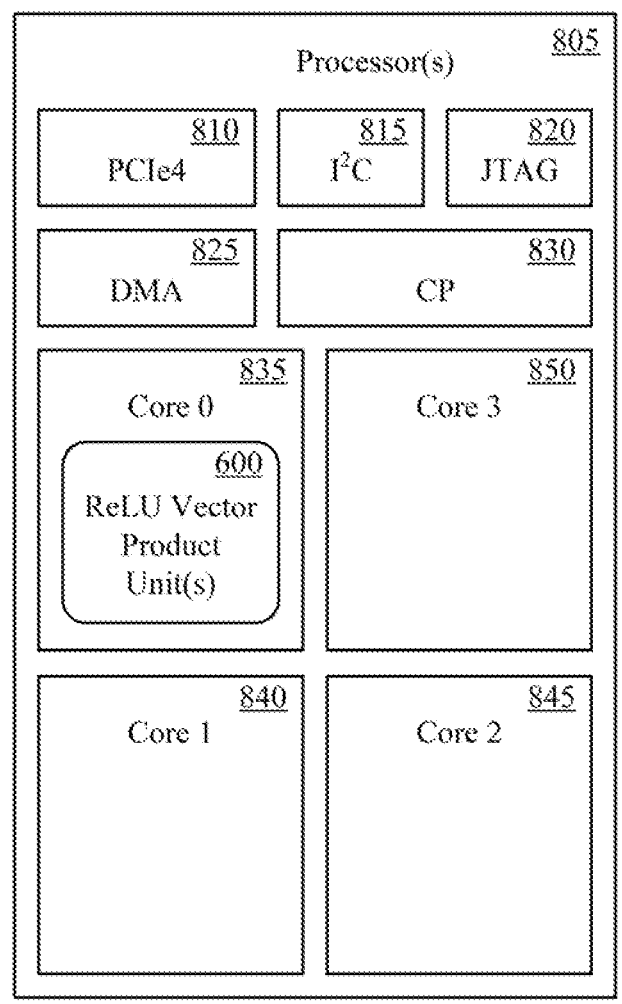
FIG. 8 shows an exemplary processor including a rectified linear vector-vector multiplication product unit, in accordance with aspects of the present technology.

Referring now to FIG. 8 an exemplary processor including a rectified linear vector-vector multiplication product unit, in accordance with aspects of the present technology, is shown. The processor 805 can include one or more communication interfaces, such as peripheral component interface (PCIe4) 810 and inter-integrated circuit ($I^2C$) interface 815, an on-chip circuit tester, such as a joint test action group (JTAG) engine 820, a direct memory access engine 825, a command processor (CP) 830, and one or more cores 835-850. The one or more cores 835-850 can be coupled in a direction ring bus configuration. The one or more cores 835-850 can execute one or more sets of computing device executable instructions to perform one or more functions including, but not limited to, estimation of rectified linear vector-vector multiplication products as described above. The one or more functions can be performed on individual core 835-850, can be distributed across a plurality of cores 835-850, can be performed along with one or more other functions on one or more cores, and or the like.

The processor 805 can be a central processing unit (CPU), a graphics processing unit (GPU), a neural processing unit (NPU), a vector processor, a memory processing unit, or the like, or combinations thereof. In one implementation, one or more processors 805 can be implemented in a computing devices such as, but not limited to, a cloud computing platform, an edge computing device, a server, a workstation, a personal computer (PCs), or the like.

Figure 9:
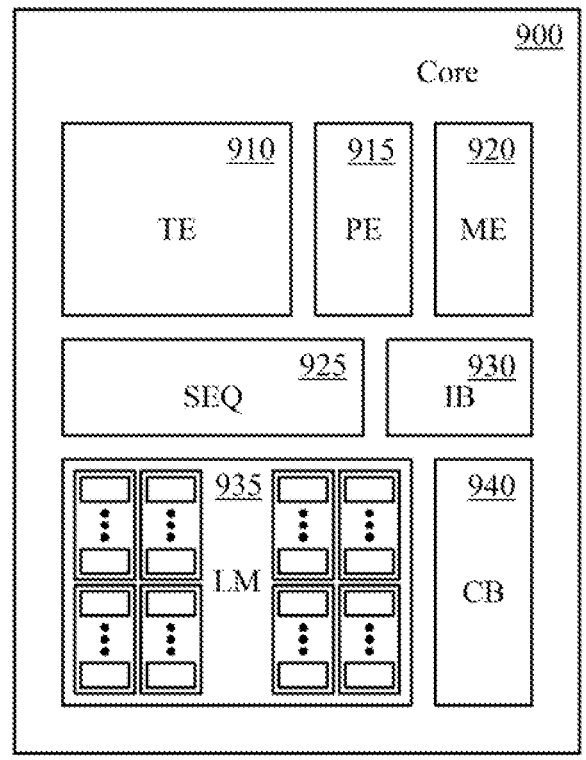
FIG. 9 shows an exemplary processing core, in accordance with aspects of the present technology.

Referring now to FIG. 9, an exemplary processing core, in accordance with aspects of the present technology, is shown. The processing core 900 can include a tensor engine (TE) 910, a pooling engine (PE) 915, a memory copy engine (ME) 920, a sequencer (SEQ) 925, an instructions buffer (IB) 930, a local memory (LM) 935, and a constant buffer (CB) 940. The local memory 935 can be pre-installed with model weights and can store in-use activations on-the-fly. The constant buffer 940 can store constants for batch normalization, quantization and the like. The tensor engine 910 can be utilized to accelerate fused convolution and or matrix multiplication. The pooling engine 915 can support pooling, interpolation, region-of-interest and the like operations. The memory copy engine 920 can be configured for inter- and or intra-core data copy, matrix transposition and the like. The tensor engine 910, pooling engine 915 and memory copy engine 920 can run in parallel. The sequencer 925 can orchestrate the operation of the tensor engine 910, the pooling engine 915, the memory copy engine 920, the local memory 935, and the constant buffer 940 according to instructions from the instruction buffer 930. The processing unit core 900 can provide a rectified linear function for vector-vector multiplication. A detailed description of the exemplary processing unit core 900 is not necessary to an understanding of aspects of the present technology, and therefore will not be described further herein.

As described above, aspects of the present technology can be implemented in hardware in devices such as, but not limited to, central processing units (CPU), graphics processing units (GPU), neural processing units (NPU), vector processors, and memory processing units. However, aspects of the present technology can also be readily implemented as computing device-executable instructions (e.g., computer program) that are stored in computing device-readable media (e.g., computer memory) and executed by a computing device (e.g., processor).

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing device comprising:
    a vector-vector multiplication unit configured to compute a first portion of a vector-vector multiplication product based on a most-significant-bit set of a first vector and a most-significant-bit set of a second vector during a first computation pass, and to compute a remaining portion of the vector-vector multiplication product based on one or more of a least-significant-bit set of the first vector and a least-significant-bit set of the second vector, and compute a sum of the first portion of the vector-vector multiplication product and the remaining portion of the vector-vector multiplication product during a second computation pass;
    a control unit configured to determine if the first portion of the vector-vector multiplication product is less than a predetermined threshold and to skip the second computation pass when the first portion of the vector-vector multiplication product is less than the predetermined threshold; and
    a rectified linear unit configured to output a zero scalar as a rectified linear vector-vector multiplication product result when the first portion of the vector-vector multiplication product is less than the predetermined threshold, and output a rectified linear function sum of the first portion of the vector-vector multiplication product and the remaining portion of the vector-vector multiplication product as the rectified linear vector-vector multiplication product result when the first partial vector-vector multiplication product is not less than the predetermined threshold.

2. The computing device of claim 1, wherein the vector-vector multiplication unit comprises:
    a multiplexor configured to couple the most-significant-bit set of the first vector and the most-significant-bit set of the second vector to a given one of a plurality of multipliers during the first computation pass; and
    the given one of the plurality of multipliers configured to multiply the most-significant-bit set of the first vector with the most-significant-bit set of the second vector during the first computation pass.

3. The computing device of claim 2, wherein the vector-vector multiplication unit comprises:
    the multiplexor further configured to couple respective ones of the most-significant-bit set and the least-significant-bit set of the first vector and the most-significant-bit set and the least-significant-bit set of the second vector to respective ones of the plurality of multipliers during the second computation pass;
    the plurality of multipliers further configured to multiply the most-significant-bit set of the first vector with the least-significant-bit set of the second vector, the least-significant-bit set of the first vector with the most-significant-bit set of the second vector, and the least-significant-bit set of the first vector with the least-significant-bit set of the second vector during the second computation pass; and
    an accumulator further configured to sum results of the plurality of multipliers during the second computation pass.

4. The computing device of claim 1, wherein the rectified linear unit comprises a multiplexor configured to output the zero scalar as the rectified linear vector-vector multiplication product result when the first portion of the vector-vector multiplication product is less than the predetermined threshold, and output the rectified linear function sum of the first portion of the vector-vector multiplication product and the remaining portion of the vector-vector multiplication product as the rectified linear vector-vector multiplication product result when the first portion of the vector-vector multiplication product is not less than the predetermined threshold.

5. The computing device of claim 1, wherein the control unit comprises a comparator to determine if the first portion of the vector-vector multiplication product is less than the predetermined threshold.

6. The computing device of claim 5, wherein the control unit further comprises a scheduler configured to control operation of the vector-vector multiplication unit to skip the second computation pass when the first portion of the vector-vector multiplication product is less than the predetermined threshold.

7. The computing device of claim 1, wherein the first vector comprises an activation vector and the second vector comprises a weight vector.

8. A computing device comprising:
   a plurality of sets of vector-vector multiplication units and rectified linear units, wherein,
      a first vector-vector multiplication unit is configured to compute a first portion of a vector-vector multiplication product based on a most-significant-bit set of a first vector and a most-significant-bit set of a second vector during a first computation pass, and to compute a remaining portion of the vector-vector multiplication product and compute a sum of the first portion of the vector-vector multiplication product and the remaining portion of the vector-vector multiplication product during a second computation pass; and
      a first rectified linear unit is configured to output a zero scalar as a rectified linear vector-vector multiplication product when the first portion of the vector-vector multiplication product is less than a predetermined threshold, and output a rectified linear sum of the first portion of the vector-vector multiplication product and the remaining portion of the vector-vector multiplication product as the rectified linear vector-vector multiplication product when the first portion of the vector-vector multiplication product is not less than the predetermined threshold; and
      a control unit configured to determine if the first portion of the vector-vector multiplication product is less than the predetermined threshold and to skip the second computation pass when the first portion of the vector-vector multiplication product is less than the predetermined threshold.

9. The computing device of claim 8, wherein the first vector-vector multiplication unit comprises:
   a multiplexor configured to couple the most-significant-bit set of the first vector and the most-significant-bit set of the second vector to a given one of a plurality of multipliers during the first computation pass; and
   the given one of the plurality of multipliers is configured to multiply the most-significant-bit set of the first vector with the most-significant-bit set of the second vector during the first computation pass.

10. The computing device of claim 9, wherein the first vector-vector multiplication unit further comprises:
   the multiplexor further configured to couple respective ones of the most-significant-bit set and the least-significant-bit set of the first vector and the most-significant-bit set and the least-significant-bit set of the second vector to respective one of the plurality of multipliers during the second computation pass;
   the plurality of multipliers further configured to multiply the most-significant-bit set of the first vector with the least-significant-bit set of the second vector, the least-significant-bit set of the first vector with the most-significant-bit set of the second vector, and the least-significant-bit set of the first vector with the least-significant-bit set of the second vector during the second computation pass; and
   an accumulator configured to sum results of the plurality of multipliers during the second computation pass with the first partial vector-vector multiplication product.

11. The computing device of claim 8, wherein the first rectified linear unit comprises a first multiplexor configured to output the zero scalar as the rectified linear vector-vector multiplication product result when the first portion of the vector-vector multiplication product is less than the predetermined threshold, and output the sum of the first portion of the vector-vector multiplication product and the remaining portion of the vector-vector multiplication product as the rectified linear vector-vector multiplication product result when the first portion of the vector-vector multiplication product is not less than the predetermined threshold.

12. The computing device of claim 8, wherein the control unit comprises a first comparator to determine if the first portion of the vector-vector multiplication product is less than the predetermined threshold.

13. The computing device of claim 12, wherein the control unit further comprises a scheduler configured to control operation of the vector-vector multiplication units to skip the second computation pass when the first portion of the vector-vector multiplication product is less than the predetermined threshold.

* * * * *